(12) United States Patent (10) Patent No.: US 8,170,033 B1
Kothari et al. (45) Date of Patent: May 1, 2012

(54) VIRTUAL PRIVATE LOCAL AREA NETWORK SERVICE (VPLS) FLUSH MECHANISM FOR BGP-BASED VPLS NETWORKS

(75) Inventors: Bhupesh Kothari, San Jose, CA (US); Rex Fernando, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 247 days.

(21) Appl. No.: 12/475,026

(22) Filed: May 29, 2009

Related U.S. Application Data (60) Provisional application No. 61/166,955, filed on Apr. 6, 2009.

(51) Int. Cl.
*H04L 12/28* (2006.01)
(52) U.S. Cl. .................................. 370/395.53
(58) Field of Classification Search .................. 370/395, 370/412, 235, 386, 395.53, 401, 395.31
See application file for complete search history.

(56) References Cited

U.S. PATENT DOCUMENTS

| | | | |
|---|---|---|---|
| 7,020,150 B2 * | 3/2006 | Ho et al. | 370/412 |
| 7,644,317 B1 | 1/2010 | Sajassi et al. | |
| 2007/0086455 A1 | 4/2007 | Allan et al. | |
| 2008/0112323 A1 * | 5/2008 | Agmon et al. | 370/235 |
| 2008/0225695 A1 * | 9/2008 | Balus et al. | 370/216 |
| 2010/0128728 A1 * | 5/2010 | Sun et al. | 370/392 |

FOREIGN PATENT DOCUMENTS

| | | |
|---|---|---|
| EP | 1956766 A1 | 8/2008 |
| EP | 2254276 A1 | 11/2010 |

OTHER PUBLICATIONS

K. Kompella et al., "Virtual Private LAN Service (VPLS) Using BGP for Auto-Discovery and Signaling," Network Working Group, Request for Comments: 4761, Jan. 2007, 27 pgs.
J. Scudder et al., "Capabilities Advertisement with BGP-4," Network Working Group, Request for Comments: 5492, Feb. 2009, 7 pgs.
A. Sajassi et al., "Customer MAC Address Flushing Mechanisms for Provider Backbone Bridging over VPLS," Internet Working Group, Internet Draft, Jul. 2008, 14 pgs.
B. Kothari et al., "VPLS Flush in BGP-based Virtual Private LAN Service," Network Working Group, Internet-Draft, Oct. 27, 2008, 15 pgs.

* cited by examiner

*Primary Examiner* — Man Phan
*Assistant Examiner* — Kevin Lee
(74) *Attorney, Agent, or Firm* — Shumaker & Sieffert, P.A.

(57) ABSTRACT

A network device includes a control unit configured to execute an extended layer three (L3) routing protocol within a control plane of the network device. The extended L3 routing protocol is extended to process a routing protocol control message having a set of layer two (L2) identifiers of customer devices attached to an autonomous system (AS) and an indicator that specifies a Route Target associated with a Virtual Private Local Area Network Service (VPLS) domain within the AS. The routing protocol control message conforms to a message type of the L3 routing protocol to initiate a flush of the set of L2 identifiers.

23 Claims, 6 Drawing Sheets

VIRTUAL PRIVATE LOCAL AREA NETWORK SERVICE (VPLS) FLUSH MECHANISM FOR BGP-BASED VPLS NETWORKS

This application claims the benefit of U.S. Provisional Application No. 61/166,955, filed Apr. 6, 2009, which is hereby incorporated by reference in its entirety.

TECHNICAL FIELD

The disclosure relates to computer networks and, more particularly, to virtual private local area network service (VPLS) instances established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

A virtual private local area network service (VPLS) may be used to extend two or more remote customer networks, i.e., VPLS sites, through a network (usually referred to as a provider network), such as the Internet, in a transparent manner, i.e., as if the network does not exist. In particular, the VPLS transports layer two (L2) communications, such as Ethernet packets, between customer networks via the network. In a typical configuration, routers coupled to the customer networks (such routers will be referred to as "members of the VPLS") define label switched paths (LSPs) that may be used as pseudowires within the provider network to carry encapsulated L2 communications as if these customer networks were directly attached to the same local area network (LAN).

Provider edge (PE) routers that are members of the VPLS each maintain state data including all Media Access Control (MAC) addresses learned from locally attached customer sites. In addition, each PE router also maintains state data specifying MAC addresses that belong to remote customer sites that are attached to remote PE routers. The VPLS PE routers learn MAC addresses of remote customer sites over the pseudowires that are established among all the VPLS PE routers. In case of a topology change resulting in teardown of pseudowires, VPLS PE routers delete all MAC addresses that were learned on those pseudowires.

SUMMARY

In general, this disclosure is directed to techniques for a new Media Access Control (MAC) address flush mechanism in Border Gateway Protocol (BGP)-based virtual private local area network service (VPLS). Specifically, this disclosure describes a new BGP Capability for MAC address flush mechanisms in BGP-based VPLS. A new BGP message, called VPLS-FLUSH, is introduced herein to carry type-length-values (TLVs) that are used to instruct devices to flush the MAC addresses associated with those TLVs. That is, the BGP protocol is extended to recognize the newly created VPLS-FLUSH message format described herein. In BGP-based VPLS networks, BGP is used as the control plane protocol for VPLS service. The techniques described herein extend BGP by creating a new BGP Capability to allow BGP to also be used as the control plane protocol for carrying the VPLS-FLUSH message.

The techniques may provide one or more advantages. For example, the MAC address flush mechanism described herein allows for flushing of MAC addresses when topology changes occur that do not result in teardown of a pseudowire. In such cases, only local VPLS PE routers may be aware of the topology change. The techniques allow the local VPLS PE routers to send an explicit notification for flushing MAC addresses on remote VPLS PE routers. In absence of the explicit MAC flush notification described herein, stale MAC state might be deleted only when MAC age out timer expires, which is typically in the order of minutes. Therefore, the expedited flushing of MAC addresses using the techniques described herein increases connectivity restoration time after a topology change.

As another example, allowing BGP to be re-used for the new function of MAC address flush notification in VPLS in this manner may eliminate the need for service providers to deploy a new protocol for MAC address flush notification. Using BGP for the MAC address flush mechanism also allows for efficient flooding through the use of Route Targets. BGP-signaled VPLS networks currently restrict the flow of routing messages to only the interested routers and ASes by use of Route Target extended communities and Route Target constraints. Since a VPLS PE router that triggers the MAC flush operations needs to notify all other VPLS PE routers participating in the same VPLS, the triggering PE router needs to efficiently flood the message to only the PE routers that are intended recipient of VPLS-FLUSH message. The VPLS-FLUSH message will be propagated to only those PE routers that would have received the VPLS NLRIs for the same Route Target that is carried in the VPLS-FLUSH message as well, both in intra-AS and inter-AS deployments.

In another embodiment, a method includes executing, on a network device, an extended layer three (L3) routing protocol to maintain network topology for a network, processing, with the extended L3 routing protocol, a routing protocol control message having a set of layer two (L2) identifiers of customer devices attached to an autonomous system (AS) and an indicator that specifies a Route Target associated with a Virtual Private Local Area Network Service (VPLS) domain within the AS, wherein the routing protocol control message conforms to a message type of the L3 routing protocol to initiate a flush of the set of L2 identifiers.

In another embodiment, network device includes a control unit configured to execute an extended L3 routing protocol within a control plane of the network device, wherein the extended L3 routing protocol is extended to process a routing protocol control message having a set of L2 identifiers of customer devices attached to an AS and an indicator that specifies a Route Target associated with a VPLS domain within the AS. The network device also includes a physical interface configured to receive a routing protocol control message that conforms to a message type of the L3 routing protocol to initiate a flush of the set of L2 identifiers.

In another embodiment, a computer-readable storage medium contains program instructions. The program instructions cause a programmable processor to execute an extended a L3 routing protocol to maintain network topology for a network, process, with the extended L3 routing protocol, a routing protocol control message having a set of L2 identifiers of customer devices attached to an AS and an indicator that specifies a Route Target associated with a VPLS domain within the AS, wherein the routing protocol control message conforms to a message type of the L3 routing protocol to initiate a flush of the set of L2 identifiers.

In yet another embodiment, a method comprises executing an extended L3 routing protocol within a control plane of a network device within a network, wherein the L3 routing protocol is extended to define a new message type to allow the L3 routing protocol to generate a routing protocol control message conforming to the new message type. The method further includes generating, with the extended L3 routing protocol, the routing protocol control message conforming to the new message type, wherein the routing protocol control message carries a set of L2 identifiers of customer devices attached to an AS and an indicator that specifies a Route Target associated with a VPLS domain within the AS. The routing protocol control message instructs a receiving device to flush the set of L2 identifiers when the receiving device is a member of the specified VPLS domain.

In yet another embodiment, a method comprises executing an extended L3 routing protocol within a control plane of a network device within a network, wherein the L3 routing protocol is extended to define a new message type to allow the L3 routing protocol to process a received routing protocol control message conforming to the new message type, and receiving, with a physical interface of the network device, the routing protocol control message conforming to the new message type. The protocol control message carries a set of L2 identifiers of customer devices attached to an AS and an indicator that specifies a Route Target associated with a VPLS domain within the AS, and the routing protocol control message instructs a receiving device to flush the set of L2 identifiers when the receiving device is a member of the specified VPLS domain. The method further includes processing, with the extended L3 routing protocol, the routing protocol control message conforming to the new message type to determine whether to instruct a data plane VPLS module of the network device to flush the set of L2 identifiers from the data plane of the network device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
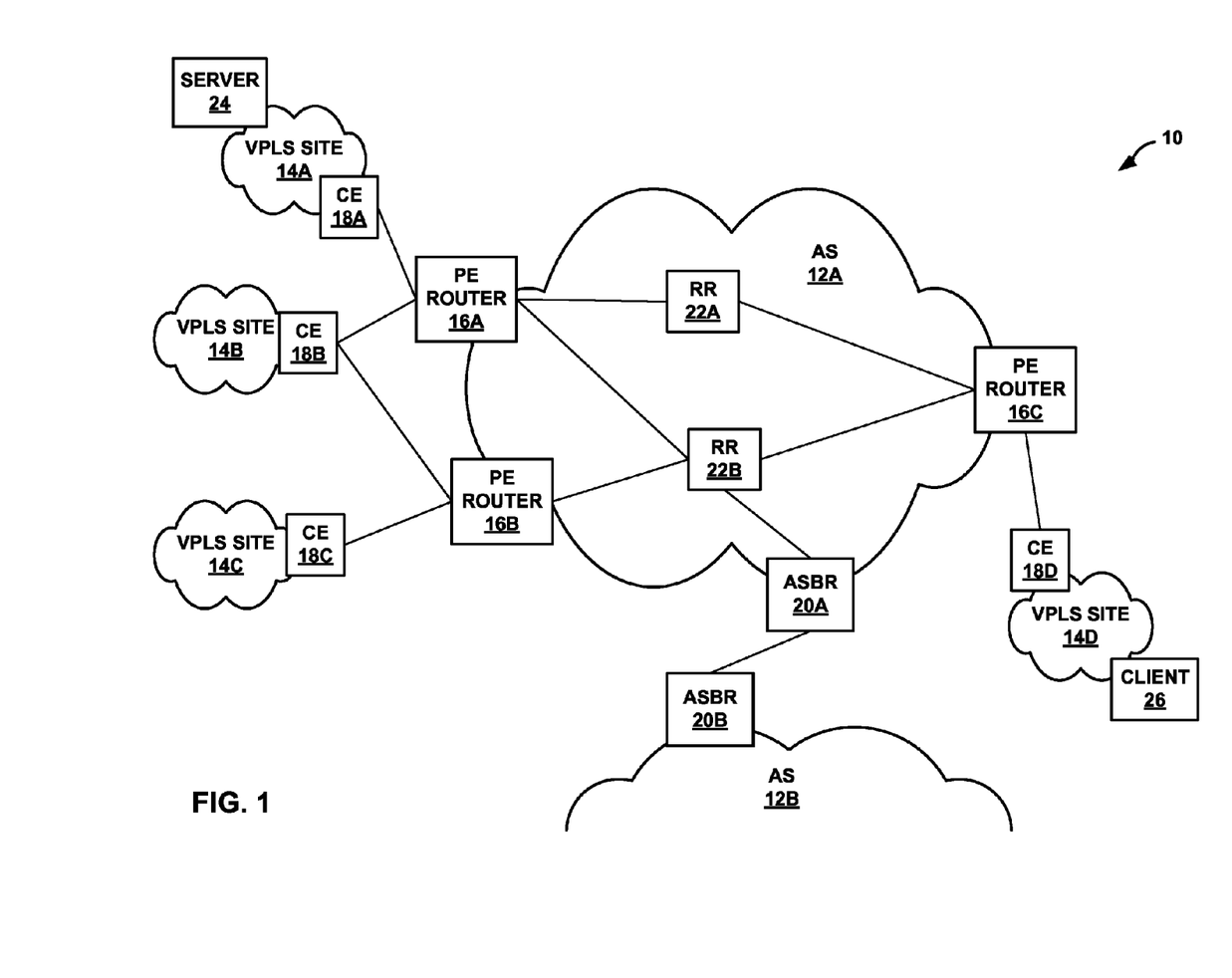
FIG. 1 is a block diagram illustrating an example service provider (SP) network that includes devices configured to employ a new Media Access Control (MAC) address flush mechanism in a Border Gateway Protocol (BGP)-based virtual private local area network service (VPLS).

FIG. 1 is a block diagram illustrating an example service provider (SP) network 10 that includes devices configured to employ a new Media Access Control (MAC) address flush mechanism in a Border Gateway Protocol (BGP)-based virtual private local area network service (VPLS). SP network 10 may comprise the Internet or other network. In some cases, SP network 10 may comprise a multi-protocol label switching (MPLS) network. As shown in FIG. 1, SP network 10 includes first AS 12A and second AS 12B, which may comprise independent networks. SP network 10 also includes VPLS sites 14A-14C ("VPLS sites 14") coupled to first AS 12A.

Each of VPLS sites 14 may include a local area network (LAN) or a wide area network (WAN) that comprises a plurality of subscriber devices, such as desktop computers, laptops, workstations, PDAs, wireless devices, network-ready appliances, file servers, print servers or other devices. VPLS sites 14 may comprise private networks for different offices of a single enterprise.

As shown in FIG. 1, first AS 12A includes provider edge (PE) routers 16A-16C ("PE routers 16"), route reflectors (RRs) 22A-22B ("RRs 22") and ASBR 20. Each of PE routers 16 couples to one or more of VPLS sites 14 via customer edge (CE) devices 18A-18D ("CE devices 18"). For example, PE router 16A is coupled to VPLS site 14A via CE device 18A (e.g., a router or switch) and to VPLS site 14B via CE device 18B. PE router 16B is coupled to VPLS site 14C via CE device 18C, and PE router 16C is coupled to VPLS site 14D via CE device 18D. Second AS 12B includes ASBR 20B. Second AS 12B may also include PE routers (not shown), and may be coupled to one or more VPLS sites (not shown).

A VPLS domain established across first AS 12A may transport layer two (L2) communications, such as Ethernet packets, between VPLS sites 14. That is, a VPLS domain may be used to extend VPLS sites 14 through SP network 10 in a transparent manner, i.e., as if SP network 10 does not exist. PE routers 16 may define label switched paths (LSPs) within first AS 12A to carry encapsulated L2 communications across first AS 12A. The LSPs may be used as pseudowires (PWs) to emulate a L2 communication service, such as Ethernet, over SP network 10 in order to exchange encapsulated L2 communications, such as Ethernet packets, across SP network 10 as though devices of the VPLS sites were directly attached to the same local area network (LAN).

PE routers 16 that are members of the VPLS domain (also sometimes referred to herein as "VPLS PE routers") each maintain state for Media Access Control (MAC) addresses learned from locally attached VPLS sites 14. In addition, each PE router 16 also maintains state for MAC addresses that belong to remote VPLS sites 14 that are attached to remote PE routers 16. PE routers 16 learn MAC addresses of remote VPLS sites 14 over pseudowires that are established among PE routers 16. In case of a topology change resulting in loss of connectivity to a customer site such as VPLS site 14B, the techniques of the invention allow PE routers 16 to generate a message to trigger flushing of only those MAC addresses that were learned from VPLS site 14B.

The MAC address flush mechanism described herein includes extending BGP to include a new BGP Capability and configuring devices in SP network 10 with the ability to generate and process BGP VPLS-FLUSH messages. VPLS-FLUSH messages are a new type of BGP message that, according to the techniques of the invention, the BGP protocol is extended to recognize as described herein. In BGP-based VPLS networks, BGP is used as the control plane protocol for VPLS service. The techniques described herein extend BGP to allow BGP to also be used as the control plane protocol for carrying VPLS-FLUSH messages. The techniques also modify a VPLS module executing on a control plane of a router to communicate with BGP executing on the control plane during generation and processing of VPLS-FLUSH messages.

Allowing BGP to be re-used for the new function of MAC address flush notification in VPLS in this manner may eliminate the need for service providers to deploy an entirely new protocol for MAC address flush notification. Using BGP for the MAC address flush mechanism also allows for efficient flooding by restricting the flow of routing messages to only the interested routers and ASes by use of Route Target extended communities and Route Target constraints. The VPLS-FLUSH message will be propagated to only those PE routers that would have received the VPLS NLRIs for the same Route Target that is carried in the VPLS-FLUSH message as well, both in intra-AS and inter-AS deployments. For more information about Route Target extended communities, see Sangli, S., et al., "BGP Extended Communities Attribute," IETF RFC 4360, February 2006 (hereinafter, "RFC 4360"), the entire contents of which is incorporated by reference herein. For more information about Route Target constraints, see Marques, P., et al., "Constrained Route Distribution for Border Gateway Protocol/MultiProtocol Label Switching (BGP/MPLS) Internet Protocol (IP) Virtual Private Networks (VPN)," IETF RFC 4684, November 2006, the entire contents of which is incorporated by reference herein.

A VPLS domain represents a bridging domain per customer. A Route Target community is used to identify all the PE routers participating in a particular VPLS domain. A service provider will therefore configure a unique Route Target for each customer. A source PE router is a VPLS PE router that originates either the VPLS NLRI or VPLS-FLUSH message. The source PE router address is carried in a Route Origin Extended Community. Use of this community for VPLS advertisements is described in Kompella, K., et al., "Multi-homing in BGP-based Virtual Private LAN Service," Nov. 3, 2008, Internet Draft, updates RFC 4761, the entire contents of which are incorporated by reference herein.

PE routers 16 advertise the VPLS Flush Capability to their BGP peers. To advertise the VPLS Flush Capability to a peer, PE routers 16 as BGP speakers use a BGP Capabilities Advertisement. The BGP Capabilities Advertisement includes a Capability code that indicates the BGP speaker has the VPLS Flush Capability. Further details relating to the BGP Capabilities Advertisement may be found in Scudder, J., et al, "Capabilities Advertisement with BGP-4," February 2009, RFC 5492, the entire contents of which are incorporated by reference herein. By advertising the VPLS Flush Capability to a peer, a PE router 16 conveys to its peer that the PE router is capable of receiving and properly handling a VPLS-FLUSH message from the peer. A PE router 16 should send a VPLS Flush Capability to a peer only if a BGP VPLS address family is also enabled and negotiated with the peer.

PE router 16A is multi-homed to VPLS site 14A and VPLS site 14B. As one example, assume that connectivity to VPLS site 14A is lost. Alternatively, PE router 16A may detect that PE router 16A has lost the Designated Forwarder election for VPLS site 14A. PE router 16A may be notified of the loss of connectivity or loss of Designated Forwarder election through the exchange of BGP control messages or other mechanisms. The effect of such topology changes is that information previously learned by PE routers 16B and 16C regarding the MAC addresses for VPLS site 14A as being reachable through PE router 16A is no longer current. In conventional BGP-based VPLS operation, PE router 16A would send a BGP control message having a Down bit ("D-bit") notification. Normally, when a PE router receives the D-bit notification, the PE router flushes all MAC state learned from the sending PE router. Contrary to the conventional BGP-based VPLS operation, in response to identifying such a topology change, PE router 16A generates a VPLS-FLUSH message in accordance with the principles of the invention.

As described in further detail below, PE router 16A may be configured to only send a VPLS-FLUSH message in particular circumstances in which the default VPLS flush mechanisms are not desirable. In the current example, it is desirable for PE router 16A to send a VPLS-FLUSH message to tell PE routers 16B and 16C to flush the MAC addresses learned over the pseudowire from PE router 16A, rather than letting PE routers 16B and 16C flush all of the MAC addresses learned through PE router 16A, i.e., those associated with both VPLS sites 14A and 14B. The extensions to BGP and VPLS described herein allow PE router 16A to send a list of the MAC addresses belonging to VPLS site 14B, allowing remote PE routers to be flushed without having to flush all of the MAC addresses for all of the VPLS sites 14 associated with PE router 16A.

In SP network 10, customer site MAC address learning is confined to PE routers 16. Any intermediate nodes, such as RRs 22A-22B ("RRs 22"), do not maintain state for MAC addresses. When RRs 22 or ASBR 20A receive a VPLS-FLUSH message, in one embodiment, RRs 22 and ASBR 20A will not do BGP path selection for VPLS-FLUSH messages. RRs 22 and ASBR 20A may process the attributes contained in the VPLS-FLUSH message for loop detection and for RT constraints before propagating the message to other BGP peers, but RRs 22 and ASBR 20A may hold no permanent state for a VPLS-FLUSH message.

A PE router in SP network 10, such as PE router 16C, might receive the same VPLS-FLUSH message from a source PE router more than once due to presence of RRs 22 or ASBR 20A in the network. For example, PE router 16A may send a VPLS-FLUSH message to both RR 22A and RR 22B, and RR 22A and RR 22B may each reflect the VPLS-FLUSH message to PE router 16C. PE router 16C can use a sequence number field of the VPLS-FLUSH messages to detect duplicate VPLS-FLUSH messages. In some embodiments, PE router 16C may ignore duplicate VPLS-FLUSH messages. Other than state to detect duplicate flush messages, in one embodiment, PE routers 16 will hold no other permanent state associated with the VPLS-FLUSH messages.

Figure 2:
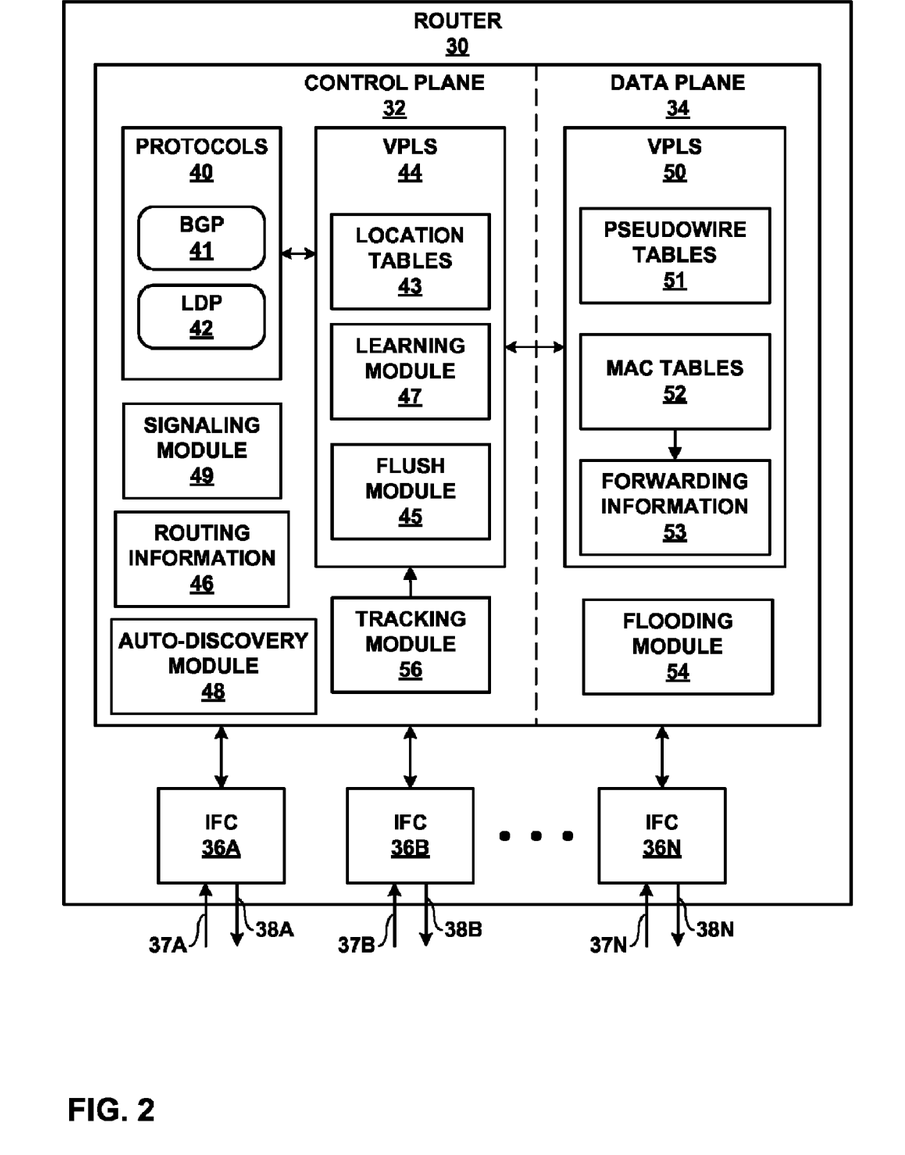
FIG. 2 is a block diagram illustrating an exemplary router having the VPLS Flush capability described herein.

FIG. 2 is a block diagram illustrating an exemplary router 30 having the VPLS Flush capability described herein. Router 30 may comprise a PE router that uses VPLS Flush techniques described herein, substantially similar to any of PE routers 16 of FIG. 1. Router 30 includes interface cards 36A-36N ("IFCs 36") that receive control packets and data packets via inbound links 37A-37N ("inbound links 37") and send control packets and data packets via outbound links 38A-38N ("outbound links 38"). IFCs 36 are typically coupled to links 37, 38 via a number of interface ports. Router 30 also includes a control plane 32 that determines routes of received packets and a data plane 34 that forwards the packets accordingly via IFCs 36.

Control plane 32 represents high-level control functions for router 30 and typically provides routing protocols, device management and configuration functions and other administrative functions. For example, control plane 32 provides an operating environment for protocols 40 to execute, which may be software processes executing on one or more processors. In the illustrated embodiment, protocols 40 include the border gateway protocol (BGP) 41 as an exemplary routing protocol and the label distribution protocol (LDP) 42.

Control plane 32 maintains routing information 46. Routing information 46 describes the topology of a network and, in particular, routes through the network. Routing information 46 may include, for example, route data that describes various routes within the first AS, and corresponding next hop data indicating appropriate neighboring devices within the first AS for each of the routes. Protocols 40 (e.g., BGP module 41 and LDP 4 module 2) executing within control plane 32 of router 30 update routing information 46 to accurately reflect the topology of the autonomous system in which router 30 resides as well as label distributions utilized by router 30. Control plane 32 generates and maintains forwarding information 53 within data plane 34 based on routing information 46. Typically, control plane 32 generates forwarding information 53 in the form of a radix tree to map packet information (e.g., header information having destination information and/or a label stack) to next hops and ultimately to interface ports of IFCs 36.

Data plane 34 represents hardware and logic functions that provide high-speed forwarding of network traffic. Data plane 34 maintains forwarding information 53 for each VPLS established by router 30 to associate network destinations with specific next hops and the corresponding interface ports. In general, when router 30 receives a data packet on a pseudowire of a given VPLS via one of inbound links 37, data plane 34 identifies an associated next hop for the data packet by traversing forwarding information 53 based on information (e.g., labeling information) within the packet. Data plane 34 forwards the data packet on one of outbound links 38 to the corresponding next hop in accordance with forwarding information 53 associated with the VPLS. At this time, data plane may push and/or pop labels from the packet to forward the packet along a correct pseudowire.

Control plane 32 also includes a VPLS module 44 having learning module 47 that performs L2 learning, e.g., learning of customer device MAC addresses from inbound PWs and association of those customer MAC addresses with corresponding outbound PWs and output interfaces. VPLS module 44 maintains location tables 43 for each VPLS instance established by router 30. Learning module 47 may alternatively reside within data plane 34.

A tracking module 56 included in control plane 32 updates location tables 43. Control plane 32 also includes an auto-discovery module 48 and a signaling module 49. Data plane 34 includes a VPLS module 50 capable of communicating with VPLS module 44. VPLS module 50 maintains pseudowire tables 51, MAC tables 52 and forwarding information 52 for each VPLS established by router 30. For example, VPLS module 50 maintains MAC tables 52 to reflect state information learned via layer 2 communications. VPLS module 50 also includes a flush module that carries out certain of the VPLS Flush mechanisms described herein. In addition, data plane 34 includes a flooding module 54.

Auto-discovery module 48 performs auto-discovery to determine which network devices within the AS are members of a given VPLS. Auto-discovery module 48 sends control messages via outbound links 38 to all the PE routers and border routers in the AS. Auto-discovery module 48 may send the control messages using a reliable transport protocol, such as BGP module 41. The control messages between router 30 in the AS and the PE routers in the AS may comprise internal BGP (iBGP) messages. The control messages between router 30 in the AS and a border router and PE routers in a second AS may comprise external BGP (eBGP) messages so as to allow the ASBRs participating in an inter-AS VPLS instance (e.g., two or more ASBRs) to automatically discover each other and exchange VPLS site ID via eBGP advertisements.

Signaling module 49 outputs control-plane messages to automatically establish pseudowires between router 30 and each of the PE routers in the AS based on the one of location tables 43 associated with the VPLS. Signaling module 49 may signal the PE routers using a label distribution protocol, such as LDP 42. Signaling module 49 then communicates with VPLS module 50 to automatically update the one of pseudowire tables 51 associated with the VPLS within VPLS module 50.

VPLS module 50 included in data plane 34 performs MAC address learning to automatically update portions of forwarding information 53 for each VPLS established by router 30. As part of data plane 34, VPLS module 50 is invoked when router 30 receives data packets on the pseudowires (PWs) established by router 30 for any of the PE routers in the first AS or the second AS that are members of the inter-AS VPLS. VPLS module 50 performs MAC address learning and updates the one of MAC tables 52 associated with the inter-AS VPLS to initially record associations between the PWs connected to router 30 and the source MAC addresses of the VPLS customer devices from which the data packets were received on the PWs. For example, the one of MAC tables 52 records PW numbers that identify the PWs connected to router 30 and records MAC addresses that identify the source customer devices attached to the first AS of the data packets transmitted over the PWs. In effect, router 30, a L3 device, learns associations between MAC address and pseudowires (which are mapped to ports), much as a L2 switch learns associations between MAC addresses and ports. Forwarding information 53 may represent a virtual port binding and bridging table. In this sense, the router is acting as a virtual L2 switch to provide VPLS service.

In order to update the one of the MAC tables 52, learning module 47 of VPLS module 44 in control plane 32 performs L2 learning and association of L2 customer MAC addresses with specific PWs. Learning module 47 then communicates information recorded in the one of location tables 43 that is associated with the VPLS instance to VPLS module 50 in data plane 34. In this way, VPLS module 50 may be programmed with associations between each PW and output interface and specific source customer MAC addresses reachable via those PWs. VPLS module 50 updates the one of MAC tables 52 associated with the VPLS to associate the customer MAC addresses with the appropriate outbound PW. After the update, the one of MAC tables 52 associated with this particular VPLS instance records associations between the PWs connected to router 30 that are used to transport L2 traffic to the MAC addresses of the customer devices within the VPLS sites of the VPLS instance. In other words, the one of MAC tables 52 for this VPLS instance records associations between the PWs and the network devices to which data packets may be sent on the PWs. For example, the one of MAC tables 52 records PW numbers that identify the PWs sourced by router 30, and for those PW numbers identifies the MAC addresses of the reachable customer devices within the VPLS instance.

VPLS module 50 receives data packets on inbound links 37 that are destined for one of the PE routers in the AS that are members of the VPLS. VPLS module 50 determines whether the destination customer MAC address of the data packets is included in the one of MAC tables 52 associated with the VPLS. If the MAC address is included in the one of MAC tables then router 30 forwards the data packets to the destination PE router on the PW associated with the MAC address based on forwarding information 53 associated with the VPLS. If the customer MAC address is not included in the one of MAC tables 52 then flooding module 54 floods the data packets to all of the PE routers in the AS via the PWs based on forwarding information 53 associated with the VPLS. In the case the VPLS is an inter-AS VPLS, flooding module 54 also floods the data packets to the border router in the second AS based on forwarding information 53 associated with the VPLS. Upon receiving the data packets, the border router in the second AS is responsible for forwarding or flooding the data packet to the PE routers in the second AS that are members of the inter-AS VPLS.

Topology changes either in a service provider's network (e.g., AS 12A) or in a customer's network (e.g., VPLS sites 14) can result in the movement of MAC addresses from one PE router to another. In the absence of the techniques described herein for MAC flushing, such events might result in PE router 30 dropping network traffic due to stale state of MAC addresses stored on PE router 30. Although PE router 30 might include age-out timers that clear the stale state to resume the traffic forwarding, age-out timers are typically set in minutes, and convergence of the order of minutes can severely impact a customer's service. To handle such events and expedite convergence of traffic, PE router 30 is configured with the VPLS Flush Capability to allow for flushing of affected MAC addresses. As described in detail below, BGP module 41, VPLS module 44, and VPLS module 50 are extended to enable the VPLS Flush Capability and to allow router 30 to generate and/or process the new BGP VPLS-FLUSH messages.

Router 30 uses a VPLS Flush Capability to negotiate the use of VPLS-FLUSH message for MAC flush operations. When router 30 is willing to receive a VPLS-FLUSH message from its BGP peers, router 30 should advertise the VPLS Flush Capability to its BGP peers. For example, BGP module 41 may cause signaling module 49 to advertise a BGP Capabilities Advertisement that indicates the VPLS Flush Capability. Conversely, router 30 may send a VPLS-FLUSH message to a BGP peer only if router 30 has received the VPLS-FLUSH capability from the BGP peer.

To flush particular set of MAC addresses, PE router 30 originates a VPLS-FLUSH message with MAC list TLV (TLV type 0) that contains a set of MAC addresses that need to be flushed. PE router 30 may detect a change in network topology that would require flushing of MAC addresses, such as through the exchange of BGP control messages using BGP module 41 or through other mechanisms. As described in further detail below, PE router 30 may be configured so as to only send a VPLS-FLUSH message in particular circumstances in which the default VPLS flush mechanisms are not desirable. BGP module 41 may notify VPLS module 44 of a topology change, and flush module 45 of VPLS module 44 may consult location tables 43 to determine whether a VPLS-FLUSH message is required by the topology change.

Several examples will now be described to illustrate situations in which a VPLS-FLUSH message may be required or not required. Referring to FIG. 1, assume PE router 30 is positioned as PE router 16A. PE router 16A connects to multiple VPLS sites, i.e., VPLS site 14A and VPLS site 14B. When connectivity to just one of VPLS sites 14A and 14B is lost, e.g., VPLS site 14A, PE router 16A may be configured to generate a VPLS-FLUSH message to flush only the relevant MAC addresses from VPLS site 14A. When connectivity to both VPLS site 14A and VPLS site 14B goes down, PE router 16A may be configured not to generate a VPLS-FLUSH message, as the remote PE routers will flush all MAC addresses that belong to PE router 16A in the course of normal VPLS operation.

As another example, assume PE router 30 is positioned as PE router 16B in FIG. 1. As shown in FIG. 1, VPLS site 14B is given redundant connectivity to AS 12A through both PE router 16A and 16B, according to multi-homing techniques. For example, use of multi-homing in BGP-based VPLS is described in Kompella, K., et al., "Multi-homing in BGP-based Virtual Private LAN Service," Nov. 3, 2008, IETF Internet Draft, draft-kompella-l2vpn-vpls-multihoming-02.txt, the entire contents of which are incorporated by reference herein. If connectivity between VPLS site 14B and PE router 16B goes down and if PE router 16B was the designated forwarder for VPLS site 14B, PE router 16B may be configured to send a list of MAC addresses that belong to VPLS site 14B to all its BGP peers. If connectivity to both site VPLS site 14B and VPLS site 14A are down on PE router 16B, then PE router 16B is configured not to send a VPLS-FLUSH message as the remote PE routers will flush all MAC addresses that belong to PE router 16B. A VPLS-FLUSH message is only needed for cases when a primary PW is torn down and standby PWs are in operational state. Thus, PE router 16B should not advertise VPLS-FLUSH message for cases when an implicit flush due to loss of all PWs is sufficient.

When a connectivity to a customer VPLS site is lost, PE router 16B either withdraws the VPLS NLRI that PE router 16B previously advertised for the VPLS site or PE router 16B sends a BGP update message for the VPLS site's VPLS NLRI with the 'D' bit set. In either case, remote PE routers 16 learn that a particular VPLS site 14 is no longer reachable.

In FIG. 1, if PE router 16B withdraws VPLS NLRIs for both VPLS site 14A and VPLS site 14B or sends BGP update with VPLS NLRIs for both VPLS site 14A and VPLS site 14B with 'D' bit set, then PE router 16C upon receiving the withdrawal or BGP update will flush all MAC addresses that it learned from PE router 16B. PE router 16B need not send a VPLS-FLUSH message in this case.

If PE router 16B withdraws VPLS NLRIs for just VPLS site 14A or sends an update for VPLS site 14A NLRIs with 'D' bit set, then PE router 16C should not flush MAC addresses that PE router 16C learned from PE router 16B, unless PE router 16C has no standby PWs to PE router 16B.

As another example, assume PE router 30 is positioned as PE router 16C. If a single VPLS site 14D is connected to PE router 16C, and connectivity to VPLS site 14D is lost, then the PE router 16C is configured to not send a VPLS-FLUSH message as the remote PE routers will flush all MAC addresses that they learned from the source PE router 16C. Flush module 45 of VPLS 44 may also be configured such that in case of excessive link flap of a pseudowire to a VPLS site in a short duration, flush module 45 is configured to throttle advertisements of VPLS-FLUSH messages so that excessive flooding of such advertisements do not occur.

In response to flush module 45 determining that the change in network topology requires a VPLS-FLUSH message, VPLS module 44 of control plane 32 requests the VPLS module 50 of data plane 34 to convey a set of MAC addresses from VPLS 50 of data plane 34 to VPLS module 44 of control plane 32. For example, where a pseudowire has gone down, VPLS module 50 may send a set of MAC addresses that were reachable over that pseudowire. Control plane VPLS module 44 receives the set of MAC addresses from data plane VPLS module 50. VPLS module 44 conveys the set of MAC addresses to BGP module 41, which generates a VPLS-FLUSH message having a MAC list TLV that contains the set of MAC addresses to be flushed. BGP module 41 originates the VPLS-FLUSH message for a particular VPLS domain. BGP module 41 uses Route Target Extended Communities to identify the VPLS domain with which the VPLS-FLUSH message is associated. The use of Route Target Extended Communities also limits the flooding of the VPLS-FLUSH message to the member PE routers of the VPLS domain.

Where router 30 receives a VPLS-FLUSH message sent by another PE router, BGP module 41 examines the VPLS-FLUSH message to determine whether the Route Targets carried by the VPLS-FLUSH message indicate a VPLS domain with which router 30 is a member. A receiving PE router should only process TLVs for the VPLS-FLUSH messages that have a Route Target that matches one of the VPLS instance configured on the PE router. Thus, if router 30 is not a member of the VPLS domain associated with the VPLS-FLUSH message, router 30 does not process the VPLS-FLUSH message. If router 30 is a member of the VPLS domain associated with the VPLS-FLUSH message, BGP module 41 passes the contents of the MAC list TLVs to VPLS module 44 in the control plane 32, e.g., to flush module 45 of VPLS 4 module 4. Flush module 45 instructs VPLS module 50 in data plane 34 to flush the MAC addresses listed in the MAC list TLVs. VPLS module 50 then flushes the specified MAC addresses from MAC tables 52. BGP module 41 does not save any state associated with the VPLS-FLUSH message.

In the event that router 30 receives a VPLS-FLUSH message without any Route Targets, router 30 may neither process nor propagate the VPLS-FLUSH message. Router 30 should not do BGP or VPLS path selection for VPLS-FLUSH messages. Router 30 might receive the same VPLS-FLUSH message from a source PE router more than once due to presence of RRs or ASBRs in the network. Router 30 can use the sequence number field of the VPLS-FLUSH messages to detect duplicate VPLS-FLUSH messages. In some embodiments, PE router 30 may ignore duplicate VPLS-FLUSH messages. Other than state to detect duplicate flush messages, PE router 30 should hold no other permanent state associated with the VPLS-FLUSH messages.

A VPLS-FLUSH message might be lost if there are multiple failures. In such cases, the remote PE routers for which the VPLS-FLUSH message was targeted for will continue to hold stale information unless the remote PE routers age the information out or relearn the MAC addresses from a different source PE router. If a VPLS-FLUSH message is lost due to a topology change that also tears down the PWs, then the affected PE routers should flush MAC addresses learned over those PWs.

The architecture of router 30 illustrated in FIG. 2 is shown for exemplary purposes only. The disclosure is not limited to this architecture. In other embodiments, router 30 may be configured in a variety of ways. In one embodiment, for example, some of the functionally of control plane 32 and data plane 34 may be distributed within IFCs 36. In another embodiment, control plane 32 may include a routing engine that performs routing functions and maintains routing information base (RIB), e.g., routing information 46, and data plane 34 may include a forwarding engine that performs packet forwarding based on a forwarding information base (FIB), e.g., forwarding information 53, generated in accordance with the RIB and MAC tables 52.

Control plane 32 and data plane 34 may be implemented solely in software, or hardware, or may be implemented as combinations of software, hardware, or firmware. For example, control plane 32 and data plane 34 may include one or more processors which execute software instructions. In that case, the various software modules of control plane 32 and data plane 34 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable media.

Figure 3:
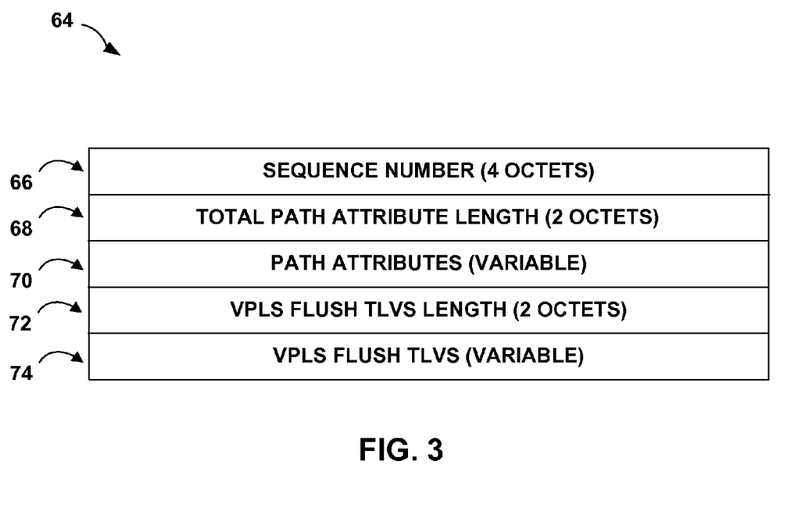
FIG. 3 is a block diagram illustrating an exemplary message format for a BGP VPLS-FLUSH message.

FIG. 3 is a block diagram illustrating an exemplary message format 64 of a BGP VPLS-FLUSH message. VPLS-FLUSH messages are a new type of BGP message defined herein, which the BGP protocol is extended to recognize according to the techniques of the invention. The VPLS-FLUSH message also includes the fixed size BGP header (not shown). The VPLS-FLUSH message format 64 includes the following fields: a Sequence Number field 66, a Total Attribute Length field 68, a Path Attributes field 70, a VPLS Flush TLVs Length field 72, and a VPLS Flush TLVs field 74.

The Sequence Number field 66 includes a 4-octets unsigned integer that indicates the current sequence number of the VPLS-FLUSH message being sent to remote VPLS PE routers. The Total Attribute Length field 68 includes a 2-octets unsigned integer that indicates the total length of the Path Attributes field 70 in octets. The value of the integer of the Total Attribute Length field 68 will be greater than 0, which implies that at least one attribute must be present.

The Path Attributes field 70 includes a variable length sequence of path attributes that are present in VPLS-FLUSH messages. The following attributes are present: Route Target Community; AS-PATH Attribute; ORIGINATOR_ID Attribute; CLUSTER_LIST Attribute; Route Origin Extended Community. The AS-PATH, ORIGINATOR_ID and CLUSTER_LIST attributes are processed and updated as in routing messages, and are present to ensure VPLS-FLUSH messages do not result in a loop. The VPLS Flush TLVs Length field 72 includes a 2-octets unsigned integer that indicates the total length of the VPLS Flush TLVs field in octets. The value of the integer must be greater than 0.

The VPLS Flush TLVs field 74 is a variable length field that contains a list of TLVs that indicates those L2 addresses to be flushed based on the value contained in each TLV. Each TLV is a triple <type, length, value> of variable length. The type is a 2-octet field that identifies one of the possible TLVs defined. Length is a 2-octet field that indicates the TLV value length. Value is of variable length and is encoded according to the TLV type. The VPLS-FLUSH message format is an extensible message format, meaning that other TLV types may be defined. If a VPLS PE router receives a VPLS-FLUSH message that contains a TLV type that the VPLS PE router does not understand, the VPLS PE router should ignore that TLV alone. The Type is a 2-octet field. A type of "0" may mean a MAC list TLV. Different TLV types are defined to flush MAC addresses based on the L2 technology in use for a VPLS domain. For example, the VPLS-FLUSH mechanisms described herein may be used in Provider Backbone Bridging (PBB) architectures, where MAC flushing may be desirable in the context of Service Instance VLAN Identifiers (I-SIDs). Other TLV types may correspond to, for example, a VLAN identifier TLV, and an I-SID TLV, or other type of TLV.

Figure 4:
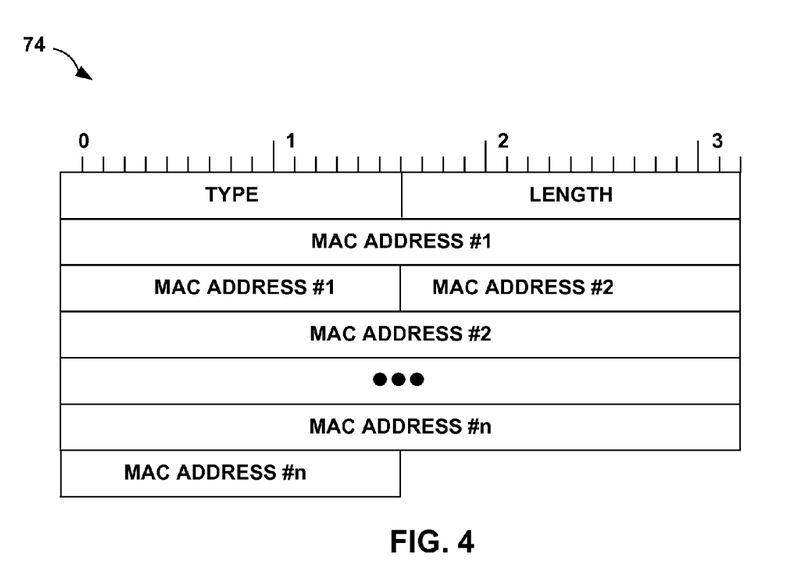
FIG. 4 is a block diagram illustrating an exemplary VPLS Flush TLV field in further detail.

FIG. 4 is a block diagram illustrating an exemplary VPLS Flush TLV field 74 in further detail. In the example of FIG. 4, the VPLS TLV field comprises a MAC list TLV. In one embodiment, a Type of 0 indicates that the TLV contains a list of 48-bit MAC addresses that should each be flushed by the PE router that processes the VPLS-FLUSH message.

The length field specifies the total length in octets of the MAC addresses present in the TLV. If the length is 0, which indicates that no MAC addresses are present, then all MAC addresses learned from the source PE router (indicated by Route Origin Extended Community) should be flushed. The length must be a multiple of 6. The encoding for MAC list is as follows: A VPLS PE router that receives a VPLS-FLUSH message with a MAC list TLV should delete each MAC address listed in the TLV that it learned from the source VPLS PE router for the VPLS domain specified by the Route Target.

Figure 5:
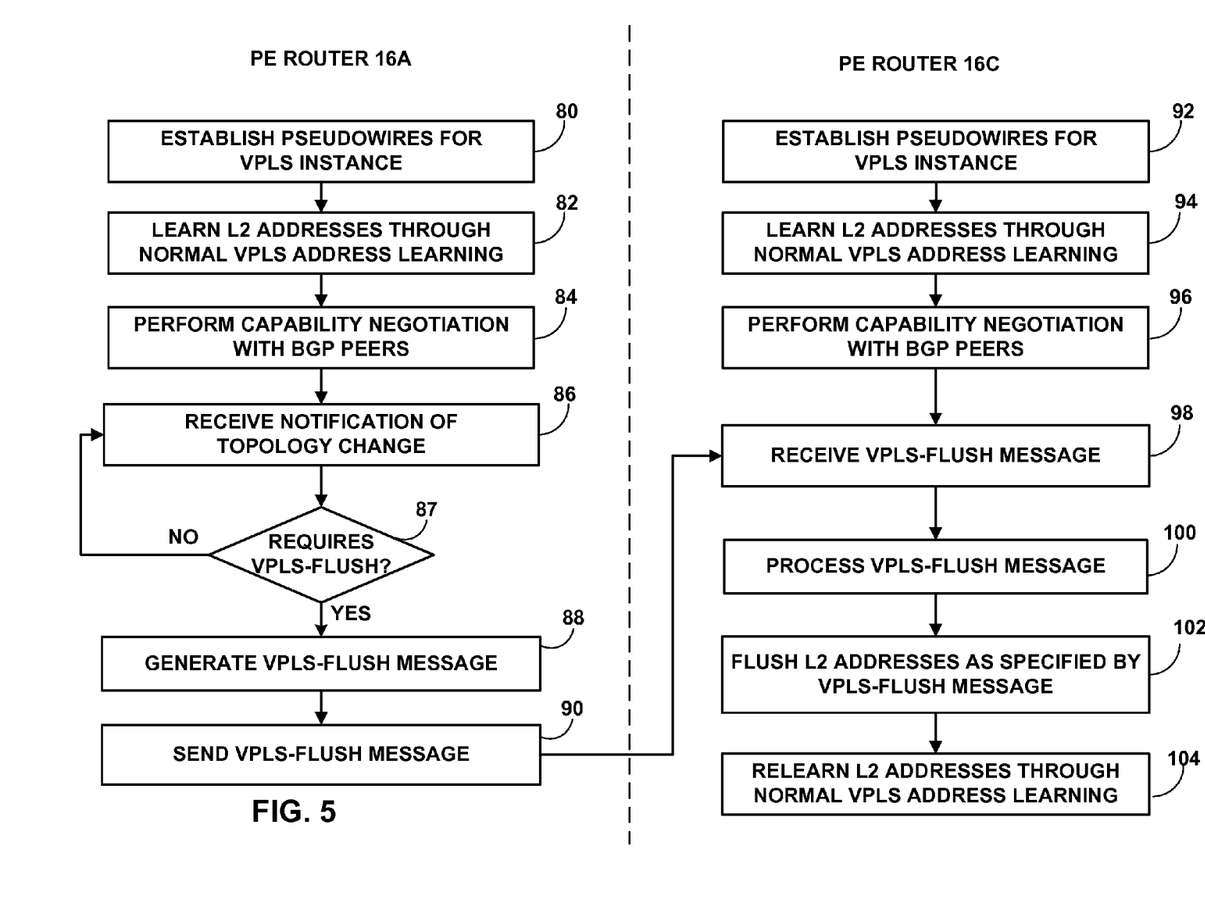
FIG. 5 is a flowchart illustrating an example mode of operation of routers in a network in using the VPLS Flush mechanisms described herein.

FIG. 5 is a flowchart illustrating an example mode of operation of routers in a network in using the VPLS Flush mechanisms described herein. FIG. 5 will be described in terms of FIGS. 1 and 2. PE router 16A establishes pseudowires for connectivity with VPLS sites 14A and 14B for a VPLS instance (80). PE router 16A performs VPLS address learning to learn L2 addresses (e.g., MAC addresses) associated with local and remote VPLS sites (82). In addition, PE router 16A performs capabilities negotiation with BGP peers (84). That is, PE router 16A advertises the VPLS Flush capability to BGP peers using a BGP Capabilities Advertisement, and may receive BGP Capabilities Advertisements from BGP peers that also indicate the VPLS Flush capability. In some cases, a service provider may configure most or all PE routers 16 within network 10 to be VPLS Flush capable.

PE router 16A may detect a change in network topology, such as through the exchange of BGP control messages using BGP module 41 or through other mechanisms (86). As described above, PE router 16A may be configured so as to only send a VPLS-FLUSH message in particular circumstances in which the default VPLS flush mechanisms are not desirable. BGP module 41 may notify VPLS module 44 of a topology change, and flush module 45 of VPLS module 44 may consult location tables 43 to determine whether a VPLS-FLUSH message is required by the topology change (87). When flush module 45 determines that the topology change requires flushing of MAC addresses, PE router 16A generates a VPLS-FLUSH message to flush particular L2 addresses as necessitated by the topology change (88). PE router 16A sends the VPLS-FLUSH message to devices within AS 12A (90).

PE router 16C may, in a manner similar to that of PE router 16A, establish pseudowires for connectivity with VPLS customer sites for a VPLS instance, e.g., VPLS site 14D (92), learn L2 addresses through VPLS learning (94), and perform capability negotiation with BGP peers (96). For example, PE routers 16A, 16B, and 16C may exchange BGP Capability advertisements.

RR 22A receives the VPLS-FLUSH message from PE router 16A, and reflects the VPLS-FLUSH message to PE router 16C (98). PE router 16C processes the VPLS-FLUSH message (100), as described in further detail below with respect to FIG. 7. If appropriate, PE router 16C flushes the L2 addresses as specified in the TLVs of the VPLS-FLUSH message (102). PE router 16C goes on to relearn L2 addresses through normal VPLS address learning (104).

Figure 6:
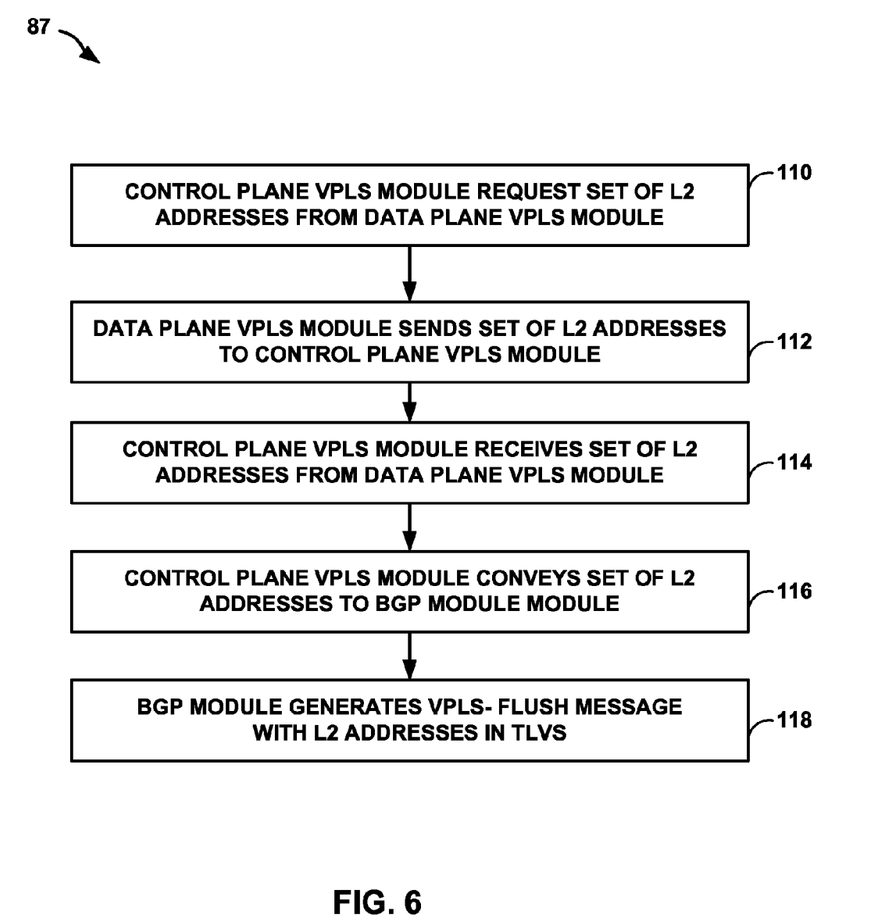
FIG. 6 is a flowchart illustrating example operation of a PE router in generating a VPLS-FLUSH message.

FIG. 6 is a flowchart illustrating example operation of PE router 16A (FIG. 1) in generating a VPLS-FLUSH message (step 87 of FIG. 5). In response to flush module 45 determining that the change in network topology requires a VPLS-FLUSH message, VPLS module 44 of control plane 32 requests the VPLS module 50 of data plane 34 to convey a set of L2 addresses (e.g., MAC addresses) from VPLS 50 of data plane 34 to VPLS module 44 of control plane 32 (110). For example, where a pseudowire has gone down, VPLS module 50 may send a set of MAC addresses that were reachable over that pseudowire. Data plane VPLS module 50 sends the set of MAC addresses to control plane VPLS module 44 based on the request (112). Control plane VPLS module 44 receives the set of MAC addresses from data plane VPLS module 50 (114). VPLS module 44 conveys the set of MAC addresses to BGP module 41 (116), which generates a VPLS-FLUSH message having a MAC list TLV that contains the set of MAC addresses to be flushed (118). BGP module 41 originates the VPLS-FLUSH message for a particular VPLS domain. BGP module 41 uses Route Target Extended Communities to identify the VPLS domain with which the VPLS-FLUSH message is associated. The use of Route Target Extended Communities also limits the flooding of the VPLS-FLUSH message to the member PE routers of the VPLS domain.

Figure 7:
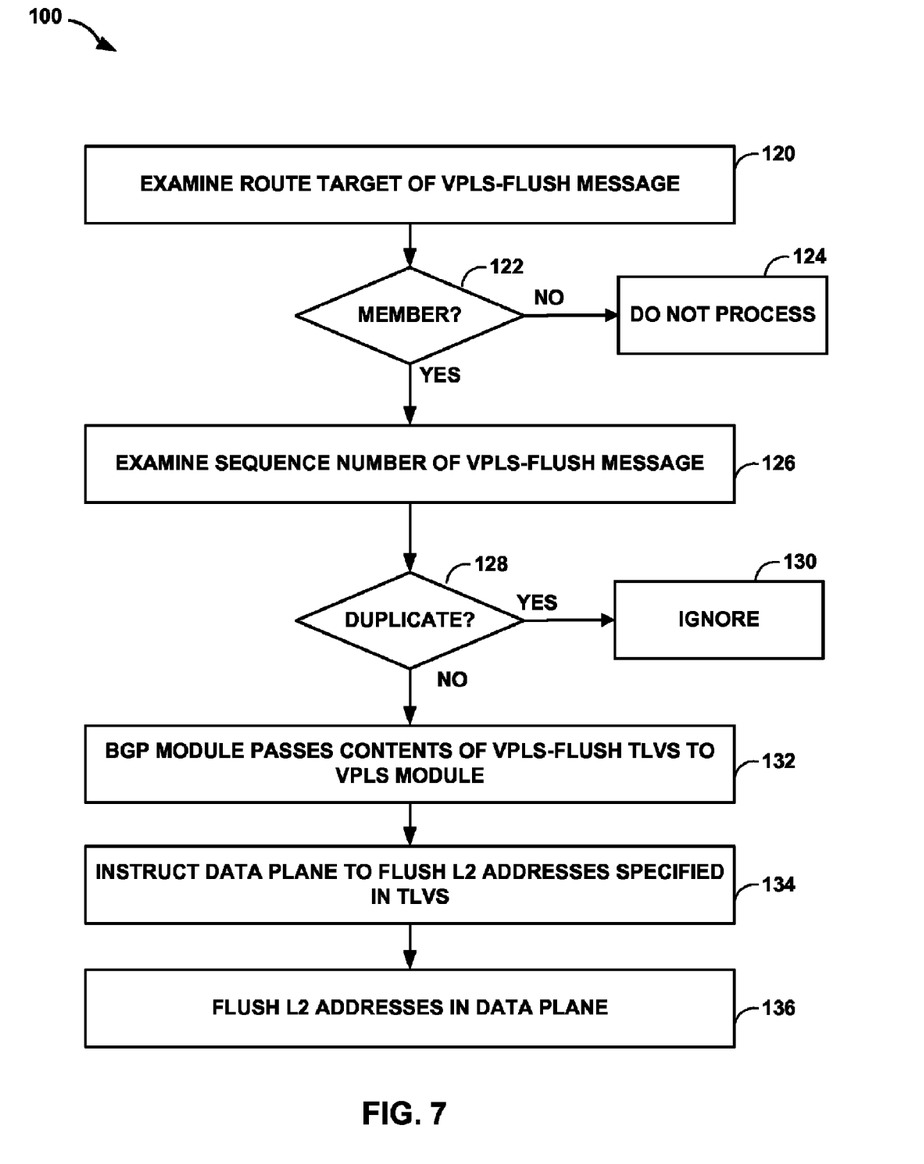
FIG. 7 is a flowchart illustrating example operation of PE router 16C (FIG. 1) in processing a received VPLS-FLUSH message.

FIG. 7 is a flowchart illustrating example operation of PE router 16C (FIG. 1) in processing a received VPLS-FLUSH message (step 100 of FIG. 5). When PE router 16C receives a VPLS-FLUSH message sent by another PE router, BGP module 41 examines the VPLS-FLUSH message (120) to determine whether the Route Targets carried by the VPLS-FLUSH message indicate a VPLS domain with which PE router 16C is a member (122). A receiving PE router should only process TLVs for the VPLS-FLUSH messages that have a Route Target that matches one of the VPLS instance configured on PE router 16C. Thus, if PE router 16C is not a member of the VPLS domain associated with the VPLS-FLUSH message, PE router 16C does not process the VPLS-FLUSH message (124). PE router 16C should not do BGP or VPLS path selection for VPLS-FLUSH messages. If PE router 16C is a member of the VPLS domain associated with the VPLS-FLUSH message, BGP module 41 may examine the sequence number field of the VPLS-FLUSH message (126) to determine whether the VPLS-FLUSH message is a duplicate VPLS-FLUSH message (128). PE router 16C may ignore duplicate VPLS-FLUSH messages (130). If the message is not a duplicate, BGP module 41 passes the contents of the MAC list TLVs to VPLS module 44 in the control plane 32, e.g., to flush module 45 of VPLS module 44 (132). Flush module 45 instructs VPLS module 50 in data plane 34 to flush the MAC addresses listed in the MAC list TLVs (134). VPLS module 50 then flushes the specified MAC addresses from MAC tables 52 (136). BGP module 41 may not save state associated with the VPLS-FLUSH message beyond what is needed to detect duplicate sequence numbers.

Various embodiments of the invention have been described. These and other embodiments are within the scope of the following claims.

The invention claimed is:

1. A method comprising:

executing, on a network device, an extended layer three (L3) routing protocol to maintain network topology for a network;

with the network device, maintaining a table associated with a Virtual Private Local Area Network Service (VPLS) domain that records associations between pseudowires and layer two (L2) identifiers of customer devices within customer networks attached to an autonomous system (AS) by the network device; and outputting to a receiving device, with the extended L3 routing protocol, a routing protocol control message that specifies a set of L2 identifiers of customer devices attached to an AS and an indicator that specifies a Route Target associated with a the VPLS domain, wherein the specified set of L2 identifiers is obtained by the network device from the table, wherein the routing protocol message instructs the receiving device to flush the specified set of L2 identifiers when the receiving device is a member of the VPLS domain, and wherein the routing protocol control message conforms to a message type of the extended L3 routing protocol to initiate a flush of the specified set of L2 identifiers.

2. The method of claim 1, further comprising:

executing the extended L3 routing protocol within a control plane of a network device;

executing a data plane VPLS module within a data plane of the network device, wherein the data plane VPLS module maintains the table; and executing a control plane VPLS module within the control plane of the network device, wherein the control plane VPLS module learns the L2 identifiers of the customer devices and provides the associations to the data plane VPLS module.

3. The method of claim 2, further comprising:

detecting a change in topology of the network with the network device, wherein the change in topology affects connectivity to a VPLS customer site associated with the VPLS domain;

determining whether the topology change requires the network device to output the routing protocol control message;

when the topology change requires the network device to send the routing protocol control message, the extended L3 routing protocol requesting from the control plane VPLS module the specified set of L2 identifiers, wherein the specified set of L2 identifiers is associated with the VPLS customer site;

with the control plane VPLS module, obtaining the specified set of L2 identifiers associated with the VPLS customer site from the data plane VPLS module;

the control plane VPLS module sending the specified set of set of L2 identifiers associated with the VPLS customer site to the extended L3 routing protocol; and with the extended L3 routing protocol, generating the routing protocol control message conforming to the message type that includes the specified set of L2 identifiers associated with the VPLS customer site and the indicator that specifies the Route Target associated with the VPLS domain.

4. The method of claim 1, further comprising:

receiving, with the extended L3 routing protocol, a second routing protocol control message having a second set of L2 identifiers of customer devices attached to the AS and a second indicator that specifies a second Route Target associated with a second VPLS domain, wherein the second routing protocol control message conforms to the message type of the extended L3 routing protocol to initiate a flush of the second set of L2 identifiers; and when the second Route Target matches a VPLS domain of which the network device is a member, flushing the set of L2 identifiers carried by the received second routing protocol control message from state data maintained by the network device for the second VPLS domain.

5. The method of claim 1, further comprising sending a BGP Capability advertisement to one or more BGP peer network devices, wherein the BGP Capability advertisement specifies a VPLS Flush Capability indicating an ability to process routing protocol control messages conforming to the message type.

6. The method of claim 1, wherein the L2 identifiers comprise medium access control (MAC) addresses.

7. The method of claim 1, wherein the L2 identifiers comprise Service Instance VLAN Identifiers (I-SIDs).

8. The method of claim 1, wherein the L2 identifiers comprise Virtual Local Area Network (VLAN) identifiers.

9. The method of claim 1, wherein the extended L3 routing protocol comprises an extended Border Gateway Protocol (BGP).

10. The method of claim 1, wherein the routing protocol control message carries the specified set of L2 identifiers in type-length-value fields of the routing protocol control message, and wherein the routing protocol control message carries the indicator that specifies the Route Target in a path attributes field of the routing protocol control message.

11. A method comprising:

executing, on a network device, an extended layer three (L3) routing protocol to maintain network topology for a network;

with the network device, maintaining a table associated with a Virtual Private Local Area Network Service (VPLS) domain that records associations between pseudowires and layer two (L2) identifiers of customer devices within customer networks attached to an autonomous system (AS) by the network device;

receiving, with a physical interface of the network device, a routing protocol control message that specifies a set of L2 identifiers of customer devices attached to an AS and an indicator that specifies a Route Target associated with the VPLS domain, wherein the routing protocol control message conforms to a message type of the extended L3 routing protocol to initiate a flush of the specified set of L2 identifiers;

determining, with the network device, whether the Route Target specified by the indicator of the received routing protocol control message matches a VPLS domain of which the network device is a member; and when the Route Target matches a VPLS domain of which the network device is a member, flushing from the table the specified set of L2 identifiers carried by the received routing protocol control message.

12. The method of claim 11, further comprising:

executing the extended L3 routing protocol within a control plane of the network device;

executing a data plane VPLS module within a data plane of the network device, wherein the data plane VPLS module maintains the table; and executing a control plane VPLS module within the control plane of the network device, wherein the control plane VPLS module learns the L2 identifiers of the customer devices and provides the associations to the data plane VPLS module.

13. The method of claim 12, wherein maintaining the table comprises maintaining the table in the data plane of the network device, further comprising:

with the extended L3 routing protocol, conveying the set of L2 identifiers to the control plane VPLS module within the control plane of the network device; and with the control plane VPLS module, instructing the data plane VPLS module to flush the set of L2 identifiers from the data plane of the network device.

14. The method of claim 11, further comprising:

examining a sequence number of the received routing protocol control message;

based on the examined sequence number, determining whether the routing protocol control message is a duplicate of a previously received routing protocol control message;

when the routing protocol control message is a duplicate, ignoring the routing protocol control message; and when the routing protocol control message is not a duplicate, processing the routing protocol control message.

15. A network device comprising:

a control unit configured to execute an extended layer three (L3) routing protocol within a control plane of the network device;

a table associated with a Virtual Private Local Area Network Service (VPLS) domain, wherein the table records association between pseudowires and Layer two (L2) identifiers of customer devices within customer networks attached to an autonomous system (AS) by the network device;

and a physical interface configured to receive a routing protocol control message that conforms to a message type of the extended L3 routing protocol to initiate a flush of a specified set of L2 identifiers of customer devices attached to an AS, wherein the routing protocol control message specifies the set of L2 identifiers and an indicator that specifics a Route Target associated with the VPLS domain, and wherein the network device is configured to, in response to receiving the routing protocol message;

output a second routing protocol control message that instructs a receiving device to flush the specified set of L2 identifiers when the receiving device is a member of the VPLS domain, and determine whether the Route Target specified by the indicator of the received routing protocol control message matches a VPLS domain of which the network device is a member; and when the Route Target matches a VPLS domain of which the network device is a member, flush from the table the set of 2 identifiers carried by the received routing: protocol control message.

16. The network device of claim 15, further comprising:

a data plane VPLS module configured to execute within a data plane of the network device, wherein the data plane VPLS module maintains the table; and a control plane VPLS module configured to execute within the control plane of the network device that learns the L2 identifiers of the customer devices and provides the associations between the pseudowires and the L2 identifiers to the data plane VPLS module.

17. The network device of claim 16, wherein when the network device receives the routing protocol control message conforming to the message type, the extended L3 routing protocol is configured not to perform routing protocol path selection for the routing protocol control message, and the control plane VPLS module and the data plane VPLS module are respectively configured not to perform VPLS path selection for the routing protocol control message.

18. The network device of claim 16, wherein the extended L3 routing protocol is configured to detect a change in topology of the network that affects connectivity to a VPLS customer site associated with the VPLS domain, and wherein the control plane VPLS module is configured to determine whether the topology change requires the network device to output the routing protocol control message that instructs the receiving device to flush the set of L2 identifiers, wherein when the topology change requires the network device to send the routing protocol control message, the extended L3 routing protocol is configured to request from the control plane VPLS module a set of L2 identifiers associated with the VPLS customer site, wherein the control plane VPLS module is configured to obtain the set of L2 identifiers associated with the VPLS customer site from the data plane VPLS module, wherein the control plane VPLS is configured to send the set of L2 identifiers associated with the VPLS customer site to the extended L3 routing protocol, wherein the extended L3 routing protocol is configured to generate the routing protocol control message that instructs the receiving device to flush the set of L2 identifiers to include the set of L2 identifiers associated with the VPLS customer site and the indicator that specifies a Route Target associated with the VPLS domain.

19. The network device of claim 16, wherein one of the extended L3 routing protocol and the control plane VPLS module is configured to determine whether the Route Target specified by the indicator of the received routing protocol control message matches a VPLS domain of which the network device is a member, and wherein when the Route Target matches a VPLS domain of which the network device is a member, the data plane VPLS module is configured to flush from the table the set of L2 identifiers carried by the received routing protocol control message.

20. The network device of claim 15, wherein the extended L3 routing protocol is configured to examine a sequence number of the received routing protocol control message, and, based on the examined sequence number, to determine whether the routing protocol control message is a duplicate of a previously received routing protocol control message, wherein when the routing protocol control message is a duplicate, the extended L3 routing protocol is configured to ignore the routing protocol control message; and wherein when the routing protocol control message is not a duplicate, the extended L3 routing protocol is configured to process the routing protocol control message.

21. The network device of claim 15, wherein the extended L3 routing protocol is configured to send a BGP Capability advertisement to one or more BGP peer network devices, wherein the BGP Capability advertisement specifies a VPLS Flush Capability indicating an ability to process routing protocol control messages conforming to the message type.

22. The network device of claim 15, wherein the extended L3 routing protocol comprises an extended Border Gateway Protocol (BGP).

23. A non-transitory computer-readable medium comprising instructions for causing a programmable processor to:

execute an extended layer three (L3) routing protocol to maintain network topology for a network, maintain a table associated with a Virtual Private Local Area Network Service (VPLS) domain that records associations between pseudowires and layer two (L2) identifiers of customer devices within customer networks attached to an autonomous system (AS) by a network device; and output to a receiving device, with the extended L3 routing protocol, a routing protocol control message that specifies a set of L2 identifiers of customer devices attached to AS and an indicator that specifies a Route Target associated with the VPLS domain, wherein the specified set of L2 identifiers is obtained by the network device from the table, wherein the routing protocol message instructs the receiving device to flush the specified set of L2 identifiers when a receiving device is a member of the VPLS domain, and wherein the routing protocol control message conforms to a message type of the extended L3 routing protocol to initiate a flush of the specified set of L2 identifiers.

* * * * *